(12) United States Patent
Hayashi et al.

(10) Patent No.: US 12,035,333 B2
(45) Date of Patent: Jul. 9, 2024

(54) DISTRIBUTED UNIT, RADIO TERMINAL, AND METHODS THEREFOR

(71) Applicant: NEC Corporation, Tokyo (JP)

(72) Inventors: Sadafuku Hayashi, Tokyo (JP); Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 613 days.

(21) Appl. No.: 17/273,768

(22) PCT Filed: May 31, 2019

(86) PCT No.: PCT/JP2019/021720
§ 371 (c)(1),
(2) Date: Mar. 5, 2021

(87) PCT Pub. No.: WO2020/049812
PCT Pub. Date: Mar. 12, 2020

(65) Prior Publication Data
US 2021/0352621 A1    Nov. 11, 2021

(30) Foreign Application Priority Data

Sep. 7, 2018 (JP) ................................ 2018-168059

(51) Int. Cl.
*H04W 72/04* (2023.01)
*H04W 4/90* (2018.01)
(Continued)

(52) U.S. Cl.
CPC ............. *H04W 72/30* (2023.01); *H04W 4/90* (2018.02); *H04W 12/03* (2021.01); *H04W 72/0453* (2013.01); *H04W 72/23* (2023.01)

(58) Field of Classification Search
CPC ....... H04W 72/30; H04W 4/90; H04W 12/03; H04W 72/0453; H04W 72/23;
(Continued)

(56) References Cited

U.S. PATENT DOCUMENTS

2009/0025060 A1    1/2009  Mukherjee et al.
2019/0150064 A1*   5/2019  Chen ..................... H04W 48/10
                                                                  370/328
(Continued)

FOREIGN PATENT DOCUMENTS

JP        2010-534959 A      11/2010
WO     WO-2018093208 A1 *    5/2018  ............ H04W 4/021
WO      2020/031728 A1        2/2020

OTHER PUBLICATIONS

CATT, CSS configuration for SI acquisition in non-initial BWP [C077], 3GPP TSG-RAN WG2 Meeting #AH-1807; R2-1810493, Montreal. Canada. Jul. 2-6, 2018 pp. 1-6 (Year: 2018).*
(Continued)

*Primary Examiner* — Lan-Huong Truong
(74) *Attorney, Agent, or Firm* — Sughrue Mion, PLLC

(57) ABSTRACT

In response to receiving a signaling message requesting a broadcast of specific system information from a central unit (1) of a base station, a distributed unit (2) of the base station changes an active downlink (DL) Bandwidth Part (BWP) of a plurality of radio terminals from a first DL BWP that is not configured with a search space (SS) for receiving the specific system information to a second DL BWP that is configured with an SS for receiving the specific system information. In addition, the distributed unit (2) broadcasts the specific system information on the second DL BWP.

17 Claims, 11 Drawing Sheets

(51) Int. Cl.
  *H04W 12/03* (2021.01)
  *H04W 72/0453* (2023.01)
  *H04W 72/23* (2023.01)
  *H04W 72/30* (2023.01)

(58) Field of Classification Search
  CPC ... H04W 12/037; H04W 48/12; H04W 88/08; H04L 5/0039; H04L 5/0092; H04L 5/001
  See application file for complete search history.

(56) References Cited

U.S. PATENT DOCUMENTS

| | | | | |
|---|---|---|---|---|
| 2019/0254030 | A1* | 8/2019 | Wu | H04W 48/12 |
| 2020/0053779 | A1* | 2/2020 | Jeon | H04B 17/318 |
| 2020/0100311 | A1* | 3/2020 | Cirik | H04W 72/23 |

OTHER PUBLICATIONS

International Search Report for PCT Application No. PCT/JP2019/021720, dated Aug. 20, 2019.

CATT, "CSS configuration for SI acquisition in non-initial BWP [C077]", 3GPP TSG-RAN WG2 Meeting #AH-1807, R2-1810493, Montreal, Canada, Jul. 2-6, 2018, pp. 1-6.

3GPP TS 38.401 V15.2.0 (Jun. 2018), "3rd Generation Partnership Project; Technical Specification Group Radio Access Network; NG-RAN; Architecture description (Release 15)", Jun. 2018, pp. 1-39.

Huawei, "System information delivery over F1 interface", 3GPP TSG-RAN WG3 NR Ad-Hoc#1801, R3-180347, Sophia Antipolis, France, Jan. 22-26, 2018, pp. 1-3.

Huawei et al., "SI reception for connected UE in BWP", 3GPP TSG-RAN2 Meeting #101 R2-1801819, Athens, Greece, Feb. 26-Mar. 2, 2018.

Qualcomm Incorporated, "System information acquisition in RRC CONNECTED over BWP", 3GPP TSG RAN WG2 Meeting #101, R2-1803683, Athens, Greece, Feb. 26-Mar. 2, 2018, pp. 1-5.

JP Office Action for JP Application No. 2022-127469, dated Sep. 19, 2023 with English Translation.

NEC, "Impact to F1 for SI reception in Connected mode", 3GPP TSG RAN WG2 #102, R2-1808252, May 11, 2018, pp. 1-3.

* cited by examiner

DISTRIBUTED UNIT, RADIO TERMINAL, AND METHODS THEREFOR

This application is a National Stage Entry of PCT/JP2019/021720 filed on May 31, 2019, which claims priority from Japanese Patent Application 2018-168059 filed on Sep. 7, 2018, the contents of all of which are incorporated herein by reference, in their entirety.

TECHNICAL FIELD

The present disclosure relates to a radio communication system and, in particular, to use of one or more bandwidth parts configured within one carrier bandwidth.

BACKGROUND ART

The 3rd Generation Partnership Project (3GPP) has been working on the standardization for the fifth generation mobile communication system (5G) to make 5G a commercial reality in 2020 or later. 5G is realized by continuous enhancement/evolution of LTE and LTE-Advanced and an innovative enhancement/evolution by an introduction of a new 5G air interface (i.e., a new Radio Access Technology (RAT)). The new RAT supports, for example, frequency bands higher than the frequency bands (e.g., 6 GHz or lower) supported by LTE/LTE-Advanced and its continuous evolution. For example, the new RAT supports centimeter-wave bands (10 GHz or higher) and millimeter-wave bands (30 GHz or higher).

In this specification, the fifth generation mobile communication system is referred to as a 5G System or a Next Generation (NextGen) System (NG System). The new RAT for the 5G System is referred to as a New Radio (NR), a 5G RAT, or a NG RAT. A new Radio Access Network (RAN) for the 5G System is referred to as a NextGen RAN (NG RAN) or a 5G-RAN. A new base station in the NG-RAN is referred to as a gNodeB (gNB). A new core network for the 5G System is referred to as a 5G Core Network (5GC) or a NextGen Core (NG Core). A radio terminal (i.e., User Equipment (UE)) capable of being connected to the 5G System is referred to as 5G UE or NextGen UE (NG UE), or simply referred to as UE.

The term "LTE" used in this specification includes enhancement/evolution of LTE and LTE-Advanced to provide interworking with the 5G System, unless otherwise specified. The enhancement/evolution of LTE and LTE-Advanced for the interworking with the 5G System is referred to as LTE-Advanced Pro, LTE+, or enhanced LTE (eLTE). Further, terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW))", include their enhancement/evolution to provide interworking with the 5G System, unless otherwise specified. Enhanced EPC, enhanced MME, enhanced S-GW, and enhanced P-GW are referred to, for example, as enhanced EPC (eEPC), enhanced MME (eMME), enhanced S-GW (eS-GW), and enhanced P-GW (eP-GW), respectively.

In LTE and LTE-Advanced, for achieving Quality of Service (QoS) and packet routing, a bearer per QoS class and per PDN connection is used in both a RAN (i.e., an Evolved Universal Terrestrial RAN (E-UTRAN)) and a core network (i.e., EPC). That is, in the Bearer-based QoS (or per-bearer QoS) concept, one or more Evolved Packet System (EPS) bearers are configured between a UE and a P-GW in an EPC, and a plurality of Service Data Flows (SDFs) having the same QoS class are transferred through one EPS bearer satisfying this QoS.

In contrast, with regard to the 5G System, although radio bearers may be used in the NG RAN, no bearers are used in the 5GC or in the interface between the 5GC and the NG-RAN. Specifically, QoS flows are defined instead of an EPS bearer, and one or more SDFs are mapped to one or more QoS flows. A QoS flow between a 5G UE and a user-plane terminating entity in an NG Core (i.e., an entity corresponding to a P-GW in the EPC) corresponds to an EPS bearer in the EPS Bearer-based QoS concept. The QoS flow corresponds to the finest granularity of the packet forwarding and treatment in the 5G system. That is, the 5G System adopts the Flow-based QoS (or per-flow QoS) concept instead of the Bearer-based QoS concept. In the Flow-based QoS concept, QoS is handled per QoS flow. Association between a 5G UE and a data network is referred to as a "PDU session". The term "PDU session" corresponds to the term "PDN connection" in LTE and LTE-Advanced. A plurality of QoS flows can be configured in one PDU session. The 3GPP specifications define a 5G QoS Indicator (5QI) corresponding to the QCI of the LTE for the 5G system.

FIG. 1 shows a basic architecture of a 5G system. The architecture shown in FIG. 1 is referred to as a "Standalone NR (in NextGen System)" or an "Option 2". A UE establishes one or more Signalling Radio Bearers (SRBs) and one or more Data Radio Bearers (DRBs) with a gNB. A 5GC and the gNB establish a control-plane interface and a user-plane interface for the UE. The control-plane interface between the 5GC and the gNB (i.e., RAN) is referred to as an NG-c interface and is used to transfer Non-Access Stratum (NAS) information and transfer control information between the 5GC and the gNB (e.g., an N2 AP Information Element). The user-plane interface between the 5GC and the gNB (i.e., the RAN) is referred to as NG-u interface and is used to transfer packets of one or more QoS flows in a PDU session of the UE.

The NR supports use of different sets of radio parameters in multiple frequency bands. Each radio parameter set is referred to as "numerology". Orthogonal Frequency Division Multiplexing (OFDM) numerology for an OFDM system includes, for example, subcarrier spacing, system bandwidth, Transmission Time Interval (TTI) length, subframe duration, cyclic prefix length, and symbol duration. The 5G system supports various types of services having different service requirements, including, for example, enhanced Mobile Broad Band (eMBB), Ultra Reliable and Low Latency Communication (URLLC), and M2M communication with a large number of connections (e.g., massive Machine Type Communication (mMTC)). Numerology selection depends on the service requirement.

The NR supports channel bandwidths wider than those of the LTE (e.g., 100 s of MHz). One channel bandwidth (i.e., a $BW_{channel}$) is a radio frequency (RF) bandwidth supporting one NR carrier. The channel bandwidth is also referred to as a system bandwidth. While the LTE supports channel bandwidths up to 20 MHz, the 5G NR supports channel bandwidths, for example, up to 500 MHz.

In order to efficiently support multiple 5G services, for example, broadband services, such as eMBBs, and narrowband services, such as Internet of Things (IoT), it is preferable to be able to multiplex these services onto a single channel bandwidth. Further, if every 5G UE has to support transmission and reception in a transmission bandwidth corresponding to the entire channel bandwidth, it may be impossible to reduce the cost of UEs and the power consumption of UEs for the narrowband IoT service. Accordingly, the 3GPP allows one or more bandwidth parts (BWPs) to be configured in the carrier bandwidth (i.e., the channel bandwidth or the system bandwidth) of each NR component carrier. The bandwidth part is also referred to as a carrier bandwidth part. Multiple BWPs may be used for different frequency division multiplexing (FDM) schemes using different numerologies (e.g., subcarrier spacing (SCS)). For example, multiple BWPs may have different SCSs and different bandwidths.

FIGS. 2 and 3 show examples of use of BWPs. In the example shown in FIG. 2, the channel bandwidth of one component carrier is divided into BWP #1 and BWP #2, and these two BWPs are used for different FDM schemes using different numerologies (e.g., different subcarrier spacing). In the example shown in FIG. 3, narrowband BWP #1 is set in a channel bandwidth of one component carrier and narrowband BWP #2 narrower than BWP #1 is further set within the BWP #1. When BWP #1 or BWP #2 is activated for a UE, the UE can reduce its power consumption by refraining from performing reception and transmission within the channel bandwidth except the active BWP.

One bandwidth part (BWP) is frequency-consecutive and consists of contiguous physical resource blocks (PRBs). The bandwidth of one BWP is at least as large as a synchronization signal (SS)/physical broadcast channel (PBCH) block. The BWP may or may not contain a SS/PBCH block (SSB).

A BWP configuration includes, for example, numerology, a frequency location, and a bandwidth (e.g., the number of PRBs). In order to specify the frequency location, common PRB indexing is used at least for a downlink (DL) BWP configuration in a Radio Resource Control (RRC) connected state. Specifically, an offset from PRB 0 to the lowest PRB of the SSB to be accessed by a UE is configured by higher layer signaling. The reference point "PRB 0" is common to all the UEs that share the same wideband component carrier.

One SS/PBCH block includes primary signals necessary for an idle UE, such as NR synchronization signals (NR-SS) and an NR physical broadcast channel (NR-PBCH). The NR-SS is used by the UE for DL synchronization. A Reference Signal (RS) is transmitted in the SS/PBCH block to enable an idle UE to perform Radio Resource Management (RRM) measurement (e.g., RSRP measurement). This RS may be the NR-SS itself or may be an additional RS. The NR-PBCH broadcasts part of the minimum System Information (SI), for example a Master Information Block (MIB). The remaining minimum SI (RMSI) is transmitted on a Physical Downlink Shared Channel (PDSCH).

A network can transmit multiple SS/PBCH blocks within the channel bandwidth of one wideband component carrier. In other words, SS/PBCH blocks may be transmitted in a plurality of BWPs within the channel bandwidth. In a first scheme, all the SS/PBCH blocks within one broadband carrier are based on NR-SS (e.g., a primary SS (PSS) and a secondary SS (SSS)) corresponding to the same physical-layer cell identity. In a second scheme, different SS/PBCH blocks within one broadband carrier may be based on NR-SSs corresponding to different physical-layer cell identities.

From a UE perspective, a cell is associated with one SS/PBCH block. Therefore, for UEs, each serving cell has a single associated SS/PBCH block in frequency domain. Note that, each serving cell is a primary cell (PCell) in carrier aggregation (CA) and dual connectivity (DC), a primary secondary cell (PSCell) in DC, or a secondary cell (SCell) in CA and DC. Such an SSB is referred to as a cell defining SS/PBCH block. The Cell defining SS/PBCH block has an associated RMSI. The Cell defining SS/PBCH block is used as the time reference or the timing reference of the serving cell. Further, the Cell defining SS/PBCH block is used for SS/PBCH block (SSB) based RRM Measurements. The Cell defining SS/PBCH block can be changed for the PCell/PSCell by "synchronous reconfiguration" (e.g., reconfiguration of radio resource configuration information using an RRC Reconfiguration procedure and not involving a handover), while it can be changed for SCells by "SCell release/add".

One or more BWP configurations for each component carrier are semi-statically signaled to the UE. Specifically, for each UE-specific serving cell, one or more DL BWPs (e.g., up to 4 DL BWPs) and one or more UL BWPs (e.g., up to 4 UL BWPs) can be configured for the UE via a dedicated RRC message. One or more DL BWPs and one or more UL BWPs configured for the UE are referred to as a "DL BWP set" and a "UL BWP set", respectively.

Each of one or more BWPs (i.e., BWP set) configured for the UE can be activated and deactivated. A BWP that has been activated is referred to as an "active BWP". Specifically, the UE receives signals on one or more active DL BWPs in the configured DL BWP set at a given time. Similarly, the UE transmits signals on one or more active UL BWPs in the configured UL BWP set at a given time. Note that in the current specifications, at most one DL BWP and at most UL BWP are activated at a given time.

The activation/deactivation of a BWP is determined by a lower layer (e.g., a Physical (PHY) layer or a Medium Access Control (MAC) layer), rather than by the RRC layer. Switching of the Active BWP is performed by, for example, Downlink Control Information (DCI) (e.g., scheduling DCI) transmitted on an NR Physical Downlink Control Channel (PDCCH). In other words, deactivation of a current active BWP and activation of a new active BWP may be performed by the DCI in the NR PDCCH. The network can activate/deactivate a BWP depending, for example, on a data rate, or on numerology required by a service, and can thereby dynamically switch the active BWP for the UE.

A BWP (i.e., initial active BWP) where the UE initially stays when the UE accesses a serving cell (i.e., when the UE transitions from Idle mode to Connected mode) is referred to as an "initial BWP". The initial BWP includes at least a DL BWP and may include a UL BWP (when an uplink is configured for the serving cell). The initial BWP may also be referred to as a default BWP, a reference BWP, a primary BWP, an anchor BWP, or a master BWP. The BWP set configured for the UE always includes the initial BWP.

The initial BWP is always configured with a Common Search Space. Meanwhile, BWPs other than the initial BWP may or may not be configured with a Common Search Space. Note that, the Common Search Space is a subset of resources (i.e., a PDCCH Search Space) in which the UE performs blind decoding to find PDCCH data (i.e., DCI). Similarly to LTE, in the 5G system, the PDCCH Search Space includes the Common Search Space and a UE-specific Search Space. The UE-specific search space is configured individually for each UE through RRC signaling. Meanwhile, all the UEs that access the serving cell are aware of the extent or range of the Common Search Space. The NR Common Search Space is used to broadcast, for example, system information, paging, and a random access channel (RACH) response. The NR Common Search Space includes a "Type0-PDCCH common search space". In the Type0-PDCCH common search space, a PDCCH (i.e., DCI) that is scrambled with a System Information Radio Network Temporary Identifier (SI-RNTI) is transmitted in order to enable the UE to receive a System Information Block Type 1 (SIB1).

In the 3GPP, it has been discussed that if the UE's active DL BWP is configured with no Common Search Space (CSS), the UE is not required to receive a system information update (SI update) through a broadcast (see, for example, Non-Patent Literature 1). In this case, the network (i.e., NG-RAN) may transmit updated SI, via dedicated signaling (e.g., an RRC Reconfiguration message), to the UE staying in the active DL BWP that is not configured with any Common Search Spaces.

Next, cloud RAN (C-RAN) deployment of the NG-RAN is described. FIG. 4 shows an overall architecture of the NG-RAN (see Non-Patent Literature 2). The NG-RAN consists of a set of gNBs connected to a 5GC via respective NG interfaces. The gNBs can be connected to each other via an Xn interface. As shown in FIG. 4, each gNB may consist of a gNB Central Unit (gNB-CU) and one or more gNB Distributed Units (gNB-DUs). The gNB-CU and the gNB-DU are connected to each other through an F1 interface. The gNB-CU is a logical node that hosts RRC, Service Data Adaptation Protocol (SDAP), and Packet Data Convergence Protocol (PDCP) protocols of the gNB (or hosts the RRC and PDCP protocols of the gNB). The gNB-DU is a logical node that hosts Radio Link Control (RLC), MAC, and PHY Layers of the gNB.

CITATION LIST

Non Patent Literature

Non-Patent Literature 1: CATT, "CSS configuration for SI acquisition in non-initial BWP [C0771]", R2-1810493, 3GPP TSG-RAN WG2 Meeting #AH-1807, Montreal, Canada, Jul. 2-Jul. 6, 2018

Non-Patent Literature 2: 3GPP TS 38.401 V15.2.0 (2018-06), "3rd Generation Partnership Project; Technical Specification Group Radio Access Network; NG-RAN; Architecture description (Release 15)", June 2018

SUMMARY OF INVENTION

Technical Problem

As described above, if the UE's active DL BWP is configured with no Search Space (SS) used for receiving system information, this UE is not required to receive the system information via a broadcast. In this case, the network (i.e., gNB) transmits the system information to the UE via dedicated signaling.

In this specification, the term "Search Space for receiving system information" means resources (i.e., a PDCCH Search Space) in which the UE performs blind decoding to find PDCCH data (i.e., DCI) that contains an indication of an update (or change) or delivery of system information. The Search Space for receiving system information may be a Common Search Space or a search space configured individually for each UE.

For example, in order to reduce power consumption of low-end UEs, the gNB may move these low-end UEs to an active DL BWP that is not configured with any SS for receiving system information (e.g., a CSS). In this case, these UEs (e.g., low-end UEs) may receive non-urgent system information when they return to a BWP (e.g., initial BWP) that is configured with an SS for receiving system information.

However, it may be preferable that specific system information, such as urgent system information, be promptly received by UEs (e.g., low-end UEs) staying in an active DL BWP that is not configured with any SS for receiving system information. If the gNB-CU sends dedicated signaling messages (e.g., RRC reconfiguration messages) in order to deliver system information to the respective UEs staying in the active DL BWP that is not configured with any SS for receiving system information, a load of the gNB-CU may increase and a load of the F1 interface between the gNB-CU and each gNB-DU may also increase.

Such urgent system information may be, for example, a Warning message of a Public Warning System (PWS). The NR (i.e., gNB) connected to the 5GC provides support for public warning systems (PWSs) through means of system information broadcast capability. The NR (i.e., gNB) is responsible for broadcasting of warning messages as well as for paging the UE to provide an indication (i.e., an ETWS/CMAS indication) that the warning message is being broadcast.

The PWS includes an Earthquake and Tsunami Warning System (ETWS) and a Commercial Mobile Alert System (CMAS). ETWS warning notifications include a primary notification (a short notification) and a secondary notification (providing detailed information). Different SIBs are defined for an ETWS primary notification, an ETWS secondary notification, and a CMAS notification. Specifically, SIB6 contains an ETWS primary notification, SIB7 contains an ETWS secondary notification, and SIB8 contains a CMAS notification.

The UE in RRC_CONNECTED monitors an ETWS/CMAS indication in any paging occasion. A paging including an ETWS/CMAS indication triggers the UE to acquire system information without delaying until the next modification period. That is, if the UE receives ETWS/CMAS indication, the UE attempts to acquire PWS-related system information (i.e., an ETWS primary notification, an ETWS secondary notification, or a CMAS notification) without delaying until the next modification period. Note that, in the case of a Bandwidth Adaptation (BA), a UE in RRC_CONNECTED monitors only paging channels on the active BWP and only acquires system information on the active BWP.

One of the objects to be attained by embodiments disclosed herein is to provide apparatuses, methods, and programs that contribute to relieving a load of a central unit (e.g., gNB-CU) and a load of an interface (e.g., F1 interface) between the central unit (e.g., gNB-CU) and each distributed unit (e.g., gNB-DU) required to send specific system information (e.g., PWS Warning messages) to radio terminals (e.g., UEs) staying in an active DL BWP that is not configured with any search space for receiving specific system information. It should be noted that the above-described object is merely one of the objects to be attained by the embodiments disclosed herein. Other objects or problems and novel features will be made apparent from the following description and the accompanying drawings.

Solution to Problem

In a first aspect, a distributed unit of a base station includes at least one memory and at least one processor coupled to the at least one memory. The at least one processor is configured to, in response to receiving from a central unit of the base station a signaling message requesting a broadcast of specific system information, change an active downlink Bandwidth Part (BWP) of a plurality of radio terminals from a first downlink BWP that is not configured with a search space for receiving the specific system information to a second downlink BWP that is configured with a search space for receiving the specific system information. The at least one processor is further configured to broadcast the specific system information on the second downlink BWP in response to receiving the signaling message.

In a second aspect, a method performed by a distributed unit of a base station includes:
(a) in response to receiving from a central unit of the base station a signaling message requesting a broadcast of specific system information, changing an active downlink Bandwidth Part (BWP) of a plurality of radio terminals from a first downlink BWP that is not configured with a search space for receiving the specific system information to a second downlink BWP that is configured with a search space for receiving the specific system information; and
(b) broadcasting the specific system information on the second downlink BWP in response to receiving the signaling message.

In a third aspect, a distributed unit of a base station includes at least one memory and at least one processor coupled to the at least one memory. The at least one processor is configured to, in response to receiving from a central unit of the base station a first signaling message that requests a broadcast of specific system information and is not associated with a particular radio terminal, generate a plurality of dedicated signaling messages, wherein each of the plurality of dedicated signaling messages contains the specific system information and is associated with a respective one of a plurality of radio terminals staying in a first downlink BWP that is not configured with a search space for receiving the specific system information. The at least one processor is further configured to transmit the plurality of dedicated signaling messages to the plurality of radio terminals on the first downlink BWP.

In a fourth aspect, a method performed by a distributed unit of a base station includes:
(a) in response to receiving from a central unit of the base station a first signaling message that requests a broadcast of specific system information and is not associated with a particular radio terminal, generating a plurality of dedicated signaling messages, wherein each of the plurality of dedicated signaling messages contains the specific system information and is associated with a respective one of a plurality of radio terminals staying in a first downlink BWP that is not configured with a search space for receiving the specific system information; and
(b) transmitting the plurality of dedicated signaling messages to the plurality of radio terminals on the first downlink BWP.

In a fifth aspect, a radio terminal includes at least one memory and at least one processor coupled to the at least one memory. The at least one processor is configured to, when the radio terminal is staying in a first downlink BWP that is not configured with a search space for receiving specific system information, receive, on the first downlink BWP, downlink control information indicating scheduling of downlink radio resources for a Radio Resource Control (RRC) message that is not encrypted with a security key. The at least one processor is further configured to, in response to receiving the downlink control information, receive, on the first downlink BWP without using the security key, a dedicated RRC message that is associated with the radio terminal and contains the specific system information.

In a sixth aspect, a method performed by a radio terminal includes:
(a) when the radio terminal is staying in a first downlink BWP that is not configured with a search space for receiving specific system information, receiving, on the first downlink BWP, downlink control information indicating scheduling of downlink radio resources for a Radio Resource Control (RRC) message that is not encrypted with a security key; and
(b) in response to receiving the downlink control information, receiving, on the first downlink BWP without using the security key, a dedicated RRC message that is associated with the radio terminal and contains the specific system information.

In a seventh aspect, a program includes a set of instructions (software codes) that, when loaded into a computer, causes the computer to perform a method according to the above-described second, fourth, or sixth aspect.

Advantageous Effects of Invention

According to the above-described aspects, it is possible to provide apparatuses, methods, and programs that contribute to relieving a load of a central unit (e.g., gNB-CU) and a load of an interface (e.g., F1 interface) between the central unit (e.g., gNB-CU) and each distributed unit (e.g., gNB-DU) required to send specific system information (e.g., PWS Warning messages) to radio terminals (e.g., UEs) staying in an active DL BWP that is not configured with any search space for receiving specific system information.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and also contribute to obtaining advantages different from one another.

The following descriptions on the embodiments mainly focus on the 3GPP 5G systems. However, these embodiments may be applied to other radio communication systems.

First Embodiment

Figure 1:
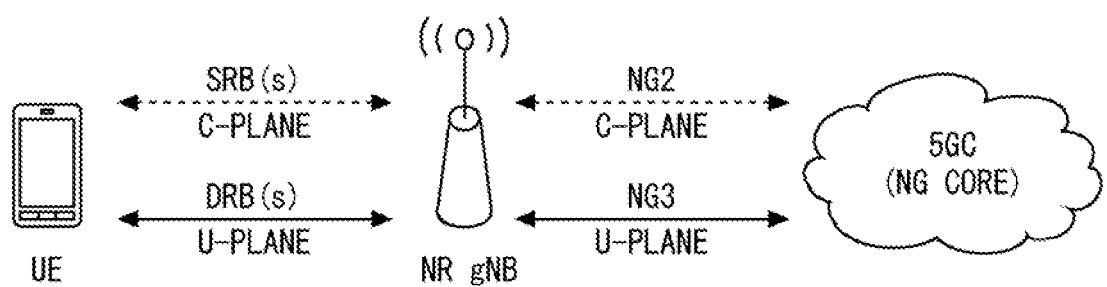
FIG. 1 shows a basic architecture of a 5G System.
Figure 2:
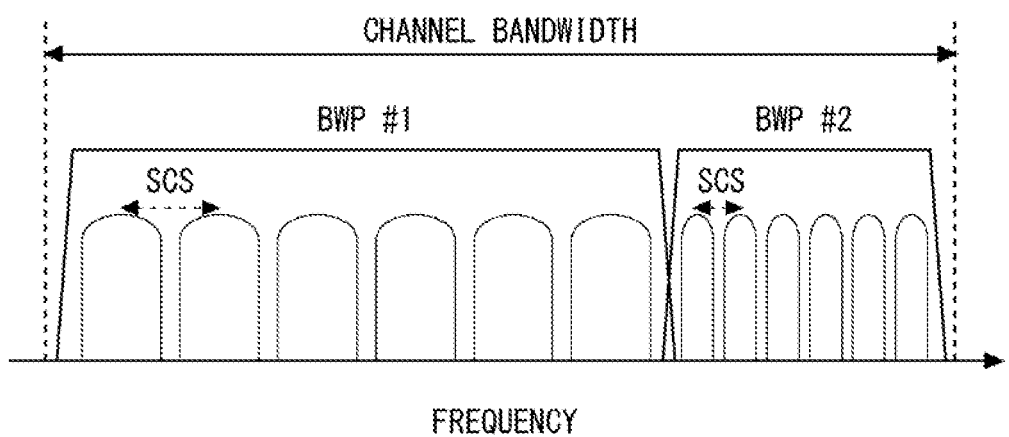
FIG. 2 shows an example of use of Bandwidth parts (BWPs)
Figure 3:
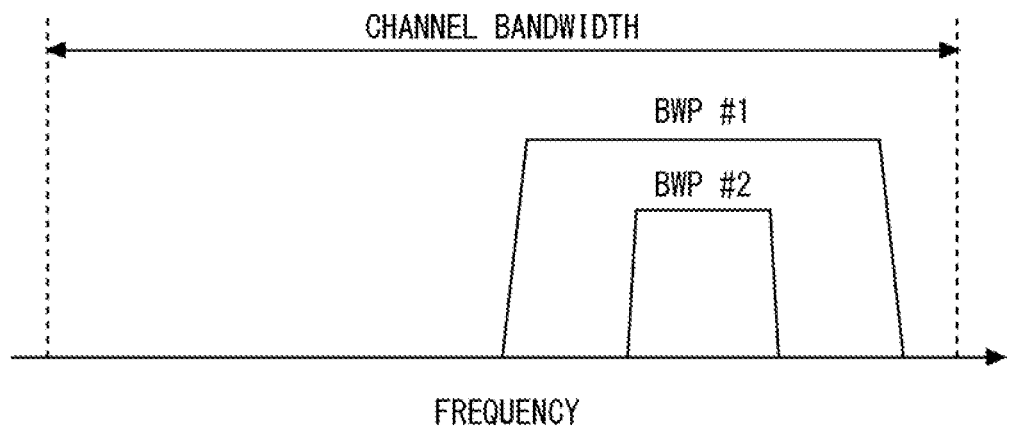
FIG. 3 shows an example of use of Bandwidth parts (BWPs)
Figure 4:
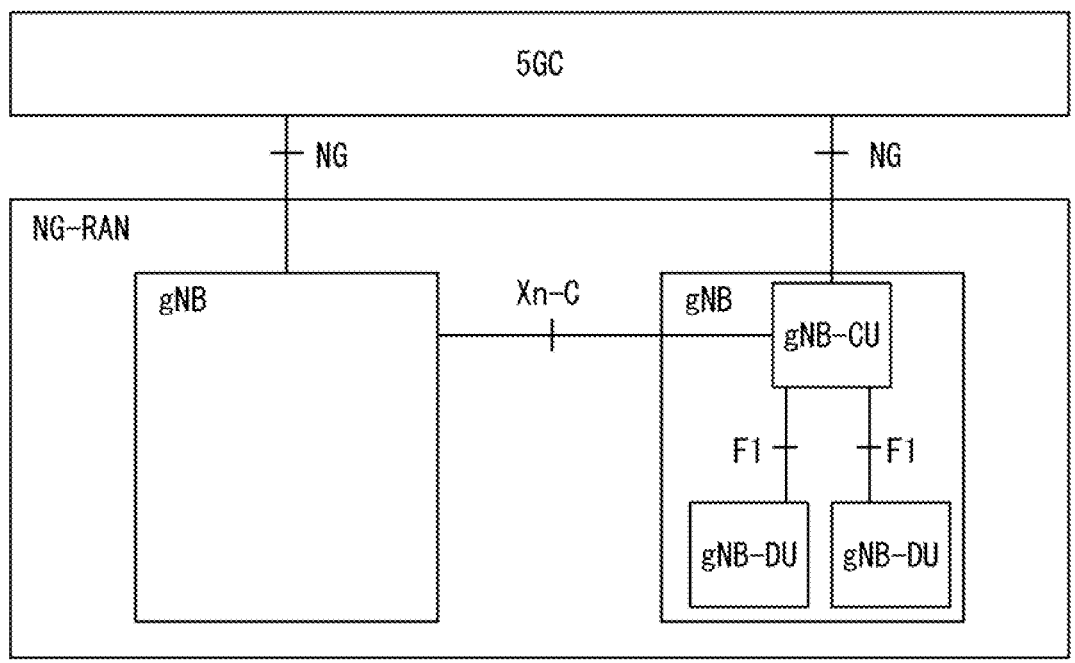
FIG. 4 shows an overall architecture of an NG-RAN.
Figure 5:
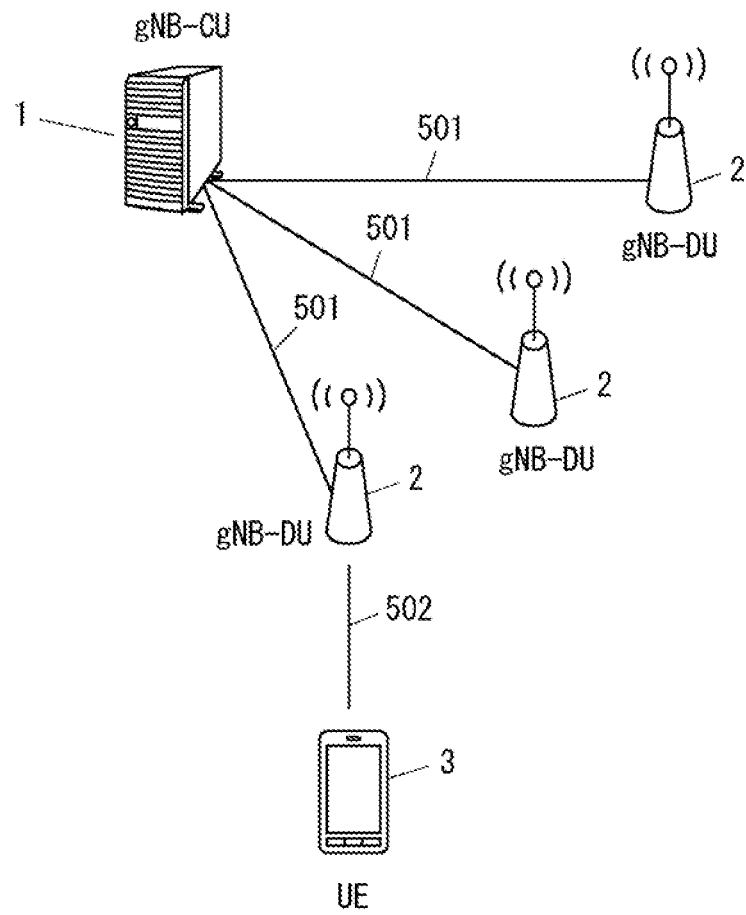
FIG. 5 shows a configuration example of a radio communication network according to a first embodiment.

FIG. 5 shows a configuration example of a radio communication network according to this embodiment. The radio communication network according to this embodiment includes a gNB Central Unit (gNB-CU) 1 and one or more gNB Distributed Units (gNB-DUs) 2. Each gNB-DU 2 is connected to the gNB-CU 1 through an interface 501. The interface 501 is an F1 interface. A UE 3 is connected to at least one gNB-DU 2 through at least one air interface 502.

Figure 6:
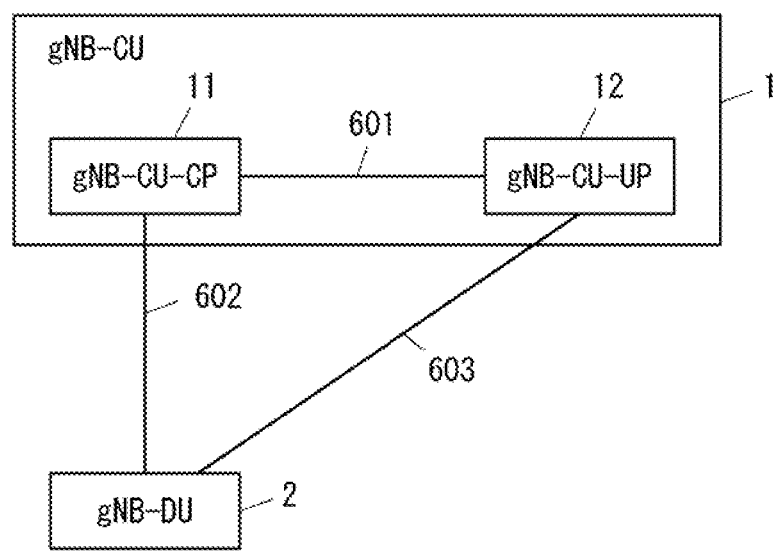
FIG. 6 shows a configuration example of a radio communication network according to the first embodiment.

As shown in FIG. 6, the gNB-CU 1 may include a Control Plane (CP) Unit (gNB-CU-CP) 11 and one or more User Plane (UP) Units (gNB-CU-UP) 12. In this case, the gNB-CU-CP 11 is connected to the gNB-CU-UP 12 through a control-plane interface 601 (i.e., an E1 interface). Further, the gNB-CU-CP 11 is connected to the gNB-DU 2 through a control-plane interface 602 (i.e., an F1-C interface). Meanwhile, the gNB-CU-UP 12 is connected to the gNB-DU 2 through a user-plane interface 603 (i.e., an F1-U interface).

The gNB-CU 1 may be a logical node that hosts the RRC, SDAP, and PDCP protocols of the gNB (or hosts the RRC and PDCP protocols of the gNB). The gNB-DU 2 may be a logical node that hosts the RLC, MAC, and PHY Layers of the gNB. In such functional arrangement, the gNB-DU 2 may determine a BWP set to be configured for the UE 3 and notify the relevant gNB-CU 1 of a configuration of the BWP set for the UE 3. Further, the gNB-DU 2 may determine an (initial) active BWP(s) for the UE 3 and notify the relevant gNB-CU 1 of it. Alternatively, the gNB-CU 1 may determine a BWP set to be configured for the UE 3 and notify the relevant gNB-DU 2 of a configuration of the BWP set for the UE 3. Additionally or alternatively, the gNB-CU 1 may determine an (initial) active BWP(s) for the UE 3 and notify the relevant gNB-DU 2 of it. Note that in any of these cases, the gNB-DU 2 may change the active BWP(s) for the UE 3. That is, the gNB-DU 2 may determine the activation/deactivation of a BWP(s). Further, the gNB-DU 2 may notify the gNB-CU 1 of information about the BWP(s) after the change. The information about the BWP(s) after the change may be, for example, information indicating whether each BWP is activated or deactivated, or information indicating a difference from the BWP(s) before the change.

Figure 7:
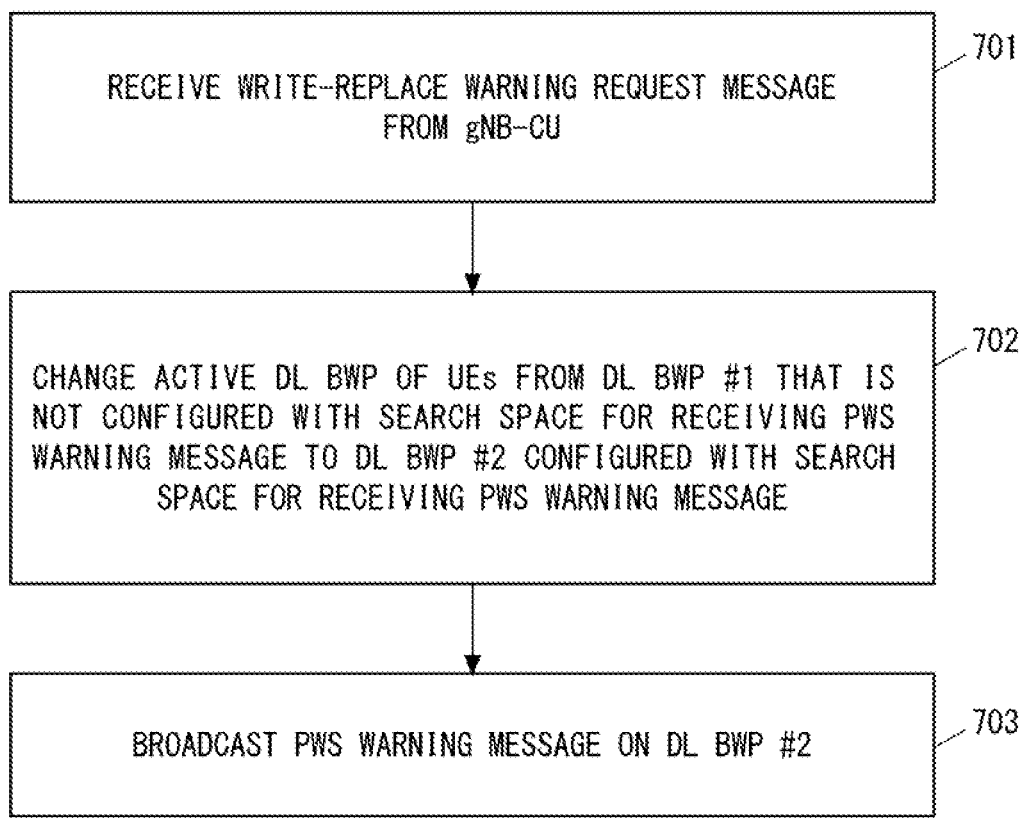
FIG. 7 is a flowchart showing an example of processing performed by a distributed node (e.g., gNB-DU) according to the first embodiment.

FIG. 7 shows processing 700, which is an example of processing performed by the gNB-DU 2. In Step 701, the gNB-DU 2 receives a WRITE-REPLACE WARNING REQUEST message from the gNB-CU 1 via the interface 501 (i.e., F1 interface). The WRITE-REPLACE WARNING REQUEST message triggers a broadcast of a PWS warning message by the gNB-DU 2. As described earlier, specific examples of the PWS warning message include an ETWS primary notification, an ETWS secondary notification, and a CMAS notification. The ETWS primary notification is contained in SIB6, the ETWS secondary notification is contained in SIB7, and the CMAS notification is contained in SIB8.

The WRITE-REPLACE WARNING REQUEST message in Step 701 contains a PWS warning message. Specifically, the WRITE-REPLACE WARNING REQUEST message includes a PWS System Information information element (IE). The PWS System Information IE includes system information for public warning, that is, a PWS warning message (e.g., an ETWS primary notification, an ETWS secondary notification, or a CMAS notification). The WRITE-REPLACE WARNING REQUEST message may further include a list of cells in which the system information is to be broadcast (i.e., a Cell To Be Broadcast List information element), a periodicity of the system information to be broadcast (i.e., a Repetition Period information element), and the number of times of the system information is to be broadcast (i.e., a Number of Broadcasts Requested information element).

In Step 702, in response to receiving the WRITE-REPLACE WARNING REQUEST message, the gNB-DU 2 changes the active DL BWP of UEs from DL BWP #1 to DL BWP #2. The DL BWP #1 is not configured with any search space for receiving the PWS warning message, which is system information (e.g., SIB6, SIB7, or SIB8), whereas the DL BWP #2 is configured with a search space for receiving the PWS warning message. Specifically, the gNB-DU 2 may transmit to each UE, on the DL BWP #1, DCI for changing the active DL BWP from the DL BWP #1 to the DL BWP #2.

In Step 703, the gNB-DU 2 broadcasts the PWS warning message on the DL BWP #2 in response to receiving the WRITE-REPLACE WARNING REQUEST message. Specifically, the gNB-DU 2 may broadcast the PWS warning message on the DL BWP #2 and transmit a PDCCH (i.e., DCI) scrambled with an SI-RNTI, on the SS of the DL BWP #2, in order to enable the UEs to receive the SIB (e.g., SIB6, SIB7, or SIB8) containing the PWS warning message. In other words, the gNB-DU 2 may transmit a paging including an ETWS/CMAS indication on the SS of the DL BWP #2.

The order of Steps 702 and 703 in FIG. 7 is determined merely for convenience in drawing FIG. 7. The change of the active DL BWP in Step 702 and the broadcast in Step 703 may be performed in parallel. The broadcast in Step 703 may be initiated prior to the change of the active BWP in Step 702.

In this example, for the sake of simplicity, a description has been given of the change of the active DL BWP of the UEs staying in the DL BWP #1 that is not configured with any search space. However, the processing shown in FIG. 7 may also be applied when there are multiple DL BWPs (e.g., DL BWP #1 and DL BWP #3) that are not configured with any search space. Specifically, in Step 702, the gNB-DU 2 may request each of the UEs staying in the DL BWP #1, which is not configured with any search space, to move to the DL BWP #2 configured with a search space, and further request each of the UEs staying in the DL BWP #3, which is not configured with any search space, to move to the DL BWP #2 (or another DL BWP) configured with a search space.

According to the processing shown in FIG. 7, in response to receiving from the gNB-CU 1 a signaling message (e.g., a WRITE-REPLACE WARNING REQUEST message) requesting a broadcast of a PWS warning message, the gNB-DU 2 changes the active DL BWP of UEs from the DL BWP #1, which is not configured with any search space for receiving the PWS warning message, to the BWP #2 configured with a search space for receiving the PWS warning message. This allows these UEs to receive the PWS warning message broadcast on the BWP #2, and thus the gNB-CU 1 is not required to send the PWS warning message to these UEs via dedicated RRC signaling. Accordingly, the procedure shown in FIG. 7 can relieve a load of the gNB-CU 1 and a load of the interface 501 between the gNB-CU 1 and the gNB-DU 2 required to send a PWS warning message to UEs staying in an active DL BWP that is configured with no search space for receiving the PWS warning message.

Figure 8:
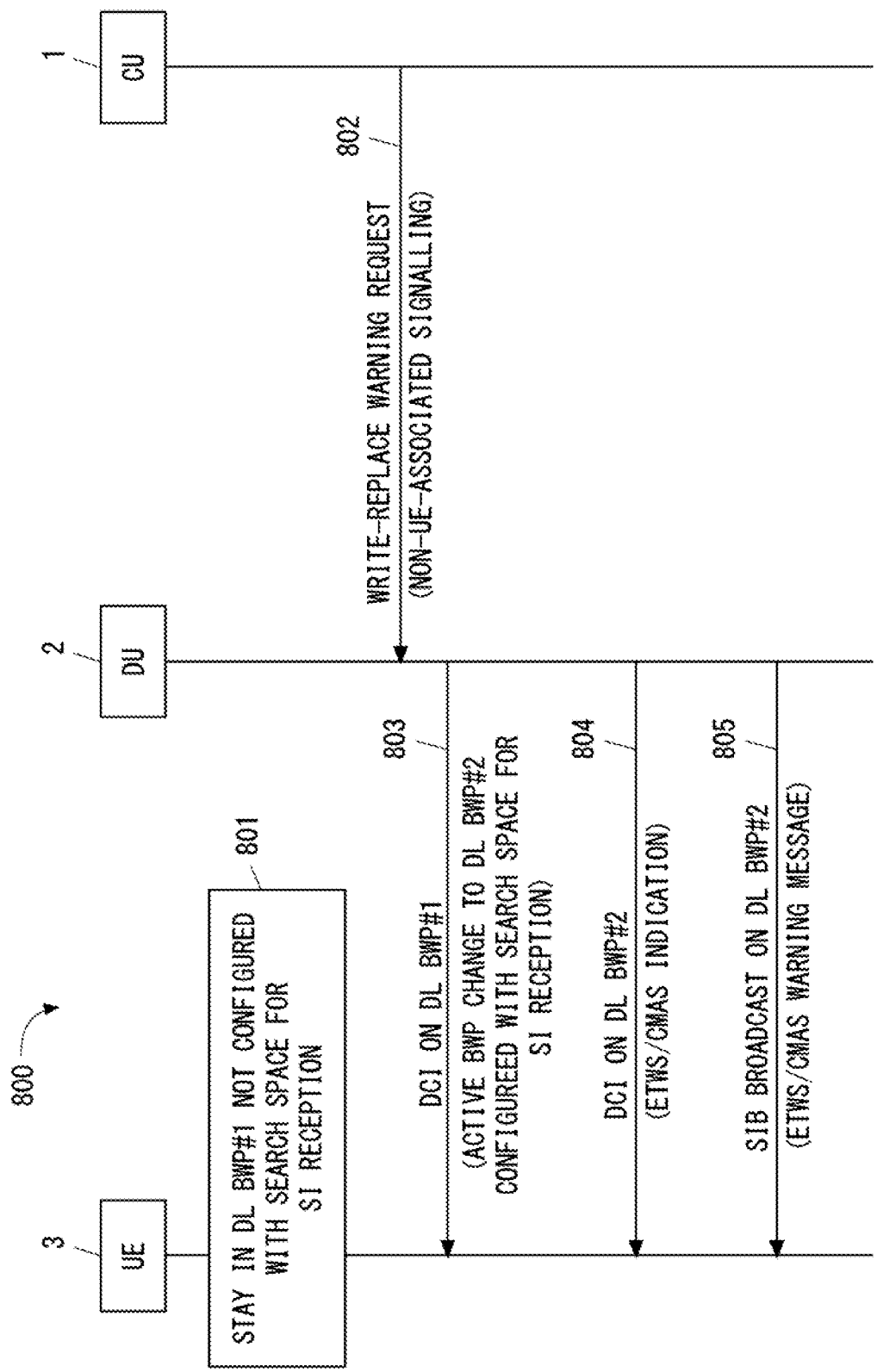
FIG. 8 is a sequence diagram showing an example of signaling regarding system information transmission according to the first embodiment.

FIG. 8 shows processing 800, which is an example of signaling regarding system information transmission according to this embodiment. In Step 801, the UE 3 stays in the DL BWP #1 that is not configured with any search space (SS) for receiving a PWS warning message, and the UE 3 operates to receive signals in the DL BWP #1. Although not shown in FIG. 8, the UE 3 has been configured with multiple DL BWPs (i.e., a DL BWP set) including the DL BWP #1 and the DL BWP #2. The DL BWP #2 is configured with a search space for receiving the PWS warning message. The DL BWP #1 may be a non-initial DL BWP of the UE 3, whereas the DL BWP #2 may be the initial DL BWP of the UE 3. In Step 801, the DL BWP #1 has been activated for the UE 3, while the other configured DL BWPs including the DL BWP #2 have been deactivated.

In Step 802, the gNB-CU 1 sends a WRITE-REPLACE WARNING REQUEST message to the gNB-DU 2. The WRITE-REPLACE WARNING REQUEST message triggers a broadcast of the PWS warning message by the gNB-DU 2. The WRITE-REPLACE WARNING REQUEST message is a signaling message that is not associated with any particular UE (i.e., non-UE-associated signalling).

In Step 803, the gNB-DU 2 changes the active DL BWP of the UE 3 from the DL BWP #1 to the BWP #2 in response to receiving the WRITE-REPLACE WARNING REQUEST message. The DL BWP #1 is not configured with any search space for receiving the PWS warning message. In contrast, the BWP #2 is configured with a search space for receiving the PWS warning message. Specifically, the gNB-DU 2 transmits to the UE 3, on the DL BWP #1, DCI for changing the active DL BWP of the UE 3 from the DL BWP #1 to the DL BWP #2.

In Step 804, the gNB-DU 2 transmits DCI scrambled with an SI-RNTI, on the SS of the DL BWP #2, in order to enable the UE 3 to receive the SIB (e.g., SIB6, SIB7, or SIB8) containing the PWS warning message. In other words, the gNB-DU 2 transmits a paging including an ETWS/CMAS indication on the SS of the DL BWP #2. The DCI (i.e., the paging including an ETWS/CMAS indication) triggers the UE 3 to acquire the system information (i.e., the PWS warning message) without delaying until the next modification period.

In Step 805, the UE 3 receives a SIB broadcast containing a PWS warning message on the DL BWP #2.

The procedure shown in FIG. 8 may be modified. For example, the DCI in Step 804 may be integrated into the DCI in Step 803. That is, the DCI in Step 803 not only indicates the change of the active DL BWP of the UE 3 from the DL BWP #1 to the DL BWP #2, but may further include an indication that triggers reception of a PWS warning message in the DL BWP #2. This enables the UE 3 to receive the PWS warning message immediately after changing its active DL BWP to the DL BWP #2.

The processing described with reference to FIGS. 7 and 8 may be used for broadcasting system information (and an update of system information) other than PWS warning messages. Specifically, the gNB-DU 2 may be configured to, in response to receiving from the gNB-CU 1 a signaling message requesting a broadcast of specific system information, change the active DL BWP of UEs from the DL BWP #1 that is not configured with any search space for receiving the specific system information to the BWP #2 configured with a search space for receiving the specific system information. This can relieve a load of the gNB-CU 1 and a load of the interface 501 between the gNB-CU 1 and the gNB-DU 2 required to send specific system information to UEs staying in an active DL BWP that is not configured with any search space for receiving the specific system information.

Second Embodiment

This embodiment provides another example of signaling regarding system information transmission. Configuration examples of a radio communication network according to this embodiment are similar to those shown in FIGS. 5 and 6.

Figure 9:
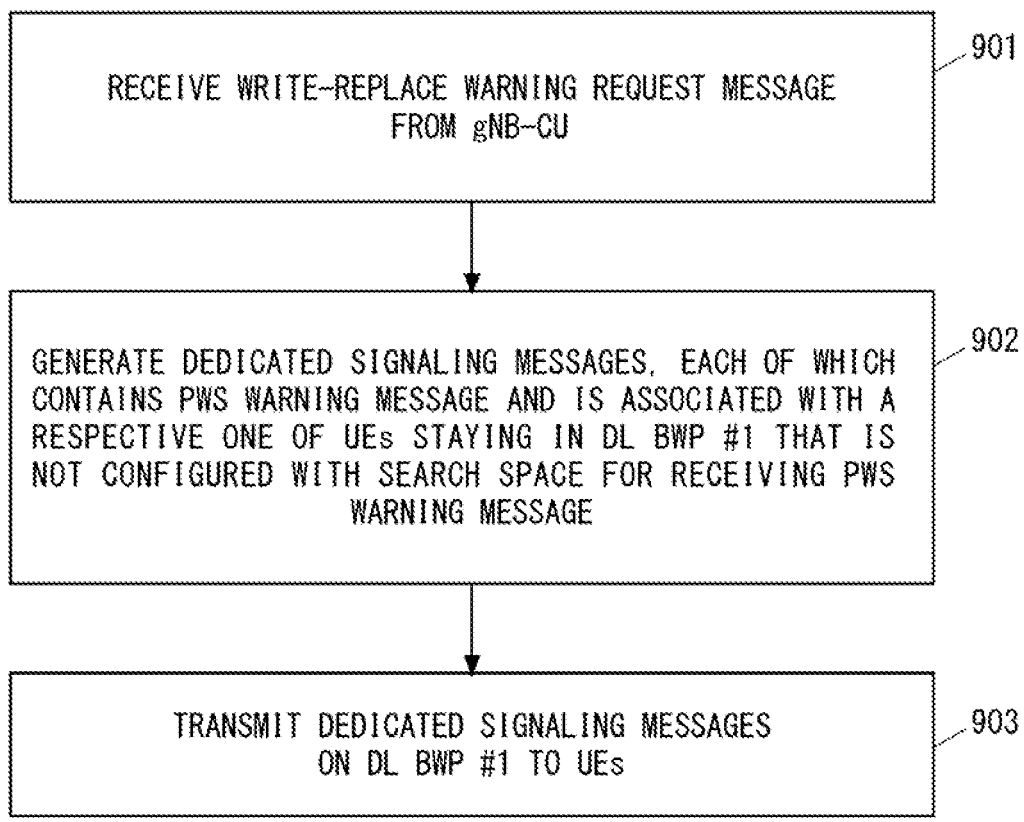
FIG. 9 is a flowchart showing an example of processing performed by a distributed node (e.g., gNB-DU) according to a second embodiment.

FIG. 9 shows processing 900, which is an example of processing performed by the gNB-DU 2. Step 901 is similar to Step 701 shown in FIG. 7. Specifically, in Step 901, the gNB-DU 2 receives a WRITE-REPLACE WARNING REQUEST message from the gNB-CU 1 via the interface 501 (i.e., F1 interface). The WRITE-REPLACE WARNING REQUEST message is a signaling message that is not associated with any particular UE (i.e., non-UE-associated signalling).

In Step 902, the gNB-DU 2 generates a plurality of dedicated signaling messages in response to receiving the WRITE-REPLACE WARNING REQUEST message. Each of these dedicated signaling messages contains the PWS warning messages and is associated with a respective one of the UEs staying in the DL BWP #1 that is not configured with any search space for receiving the PWS warning message. These dedicated signaling messages may be RRC messages. These dedicated signaling messages may be new RRC messages (e.g., RRC PWS messages) defined for PWS warning messages.

In Step 903, the gNB-DU 2 transmits the generated dedicated signaling messages to the UEs on the DL BWP #1.

Although not explicitly shown in FIG. 9, as in the case of Step 703, the gNB-DU 2 broadcasts the PWS warning message on the DL BWP #2 in response to receiving the WRITE-REPLACE WARNING REQUEST message. The DL BWP #2 is configured with a search space for receiving the PWS warning message. Accordingly, the UEs whose active DL BWP is the DL BWP #2 can receive the PWS warning message broadcast on the DL BWP #2.

According to the processing shown in FIG. 9, the gNB-DU 2, instead of the gNB-CU 1, generates dedicated RRC messages for transmitting a PWS warning message to UEs staying in a DL BWP that is configured with no search space for receiving the PWS warning message. Accordingly, the procedure shown in FIG. 9 can relieve a load of the gNB-CU 1 and a load of the interface 501 between the gNB-CU 1 and the gNB-DU 2 required to send a PWS warning message to UEs staying in an active DL BWP that is not configured with any search space for receiving the PWS warning message.

As described earlier, the gNB-CU 1 may be a logical node that hosts the RRC, SDAP, and PDCP protocols of the gNB (or hosts the RRC and PDCP protocols of the gNB), while the gNB-DU 2 may be a logical node that hosts the RLC, MAC, and PHY layers of the gNB. Put another way, the RRC functionality may be located in the gNB-CU 1. In this case, the gNB-CU 1 manages AS security keys and generates a security key (e.g., $K_{RRC-enc}$) for ciphering of RRC signaling. On the other hand, the gNB-DU 2 does not have a security key (e.g., $K_{RRC-enc}$) for ciphering of RRC signaling, and accordingly cannot encrypt the RRC messages (Step 902) each containing the PWS warning message.

To address this problem, the gNB-DU 2 may generate the RRC messages each containing the PWS warning message of Step 902 without using any security key (e.g., $K_{RRc-enc}$) for ciphering of RRC signaling. Besides, prior to transmitting the non-encrypted RRC messages, the gNB-DU 2 may transmit a special DCI to the UEs staying in the DL BWP #1. The special DCI indicates scheduling of downlink radio resources for a non-encrypted RRC message. For example, this DCI may contain a flag indicating an unprotected message.

Alternatively, the gNB-CU 1 may pass a security key (e.g., $K_{RRC-enc}$) to the gNB-DU 2 via the WRITE-REPLACE WARNING REQUEST message or a message indicating an update of system information, and the gNB-DU 2 may generate an encrypted dedicated RRC message using the received security key.

Figure 10:
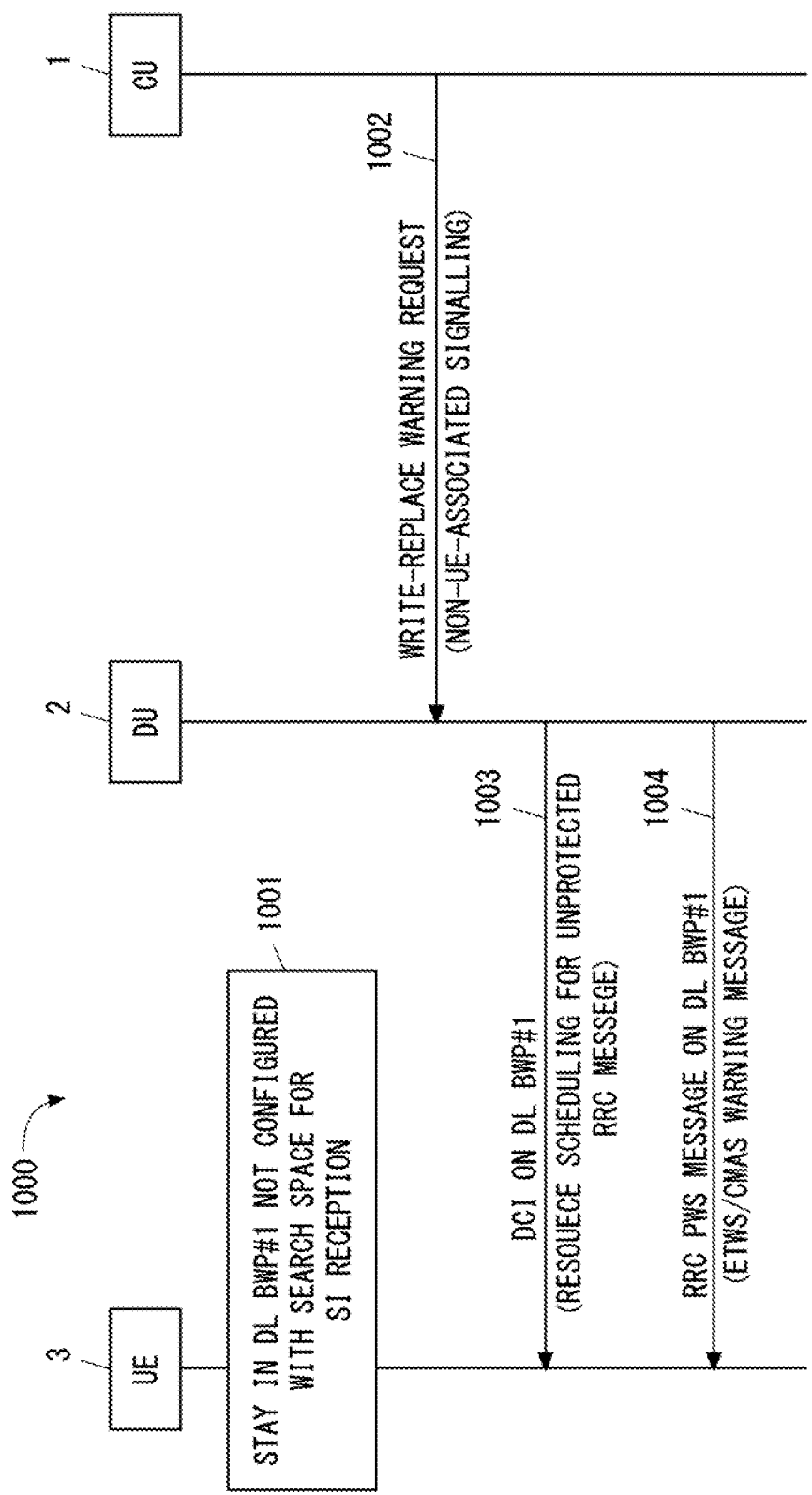
FIG. 10 is a sequence diagram showing an example of signaling regarding system information transmission according to the second embodiment.

FIG. 10 shows processing 1000, which is an example of signaling regarding system information transmission according to this embodiment. In Step 1001, the UE 3 stays in the DL BWP #1 that is not configured with any search space (SS) for receiving a PWS warning message, and the UE 3 operates so as to receive signals in the DL BWP #1. Although not shown in FIG. 10, the UE 3 has been configured with multiple DL BWPs (i.e., the DL BWP set) including the DL BWP #1 and the DL BWP #2. The DL BWP #2 is configured with a search space for receiving the PWS warning message. The DL BWP #1 may be a non-initial DL BWP of the UE 3, whereas the DL BWP #2 may be the initial DL BWP of the UE 3. In Step 1001, the DL BWP #1 has been activated for the UE 3, while the other configured DL BWPs including the DL BWP #2 have been deactivated.

Step 1002 is similar to Step 802 shown in FIG. 8. Specifically, the gNB-CU 1 sends a WRITE-REPLACE WARNING REQUEST message to the gNB-DU 2. The WRITE-REPLACE WARNING REQUEST message is a signaling message that is not associated with any particular UE (i.e., non-UE-associated signalling).

In Step 1003, in order to transmit the PWS warning message in response to receiving the WRITE-REPLACE WARNING REQUEST message, the gNB-DU 2 schedules (or allocates) resources for transmitting dedicated RRC messages to the respective UEs staying in the DL BWP #1, and transmits DCI indicating resource scheduling for the dedicated RRC message to each UE staying in the DL BWP #1.

In Step 1004, the gNB-DU 2 generates an RRC message containing the PWS warning message and transmits it on the DL BWP #1 to each UE staying in the DL BWP #1. In response to receiving the DCI (Step 1003), the UE 3 receives on the DL BWP #1 the dedicated RRC message that is associated with the UE 3 and contains the PWS warning message.

As described above, these dedicated RRC messages may not be encrypted with a security key (e.g., $K_{RRc-enc}$). In this case, the DCI in Step 1003 indicates scheduling of downlink radio resources for a non-encrypted RRC message. For example, this DCI may include a flag indicating an unprotected message. In response to receiving the DCI (Step 1003) indicating scheduling of downlink radio resources for an RRC message that is not encrypted with a security key, the UE 3 receives the dedicated RRC message, which is associated with the UE 3 and contains the PWS warning message, on the DL BWP #1 without using a security key.

Note that, when the DL BWP #2 configured with an SS for receiving the PWS warning message has been activated for the UE 3, the UE 3 receives the PWS warning message via a broadcast on the DL BWP #2.

The processing described with reference to FIGS. 9 and 10 may be used for broadcasting system information (and an update of system information) other than PWS warning messages. Specifically, the gNB-DU 2 may be configured to, in response to receiving from the gNB-CU 1 a signaling message requesting a broadcast of specific system information, generate dedicated RRC messages for transmitting a PWS warning message to respective UEs staying in the DL BWP #1 that is not configured with any search space for receiving the PWS warning message and transmit the generated dedicated RRC messages to the UEs on the DL BWP #1. By this configuration, the gNB-DU 2 can relieve a load of the gNB-CU 1 and a load of the interface 501 between the gNB-CU 1 and the gNB-DU 2 required to send specific system information to UEs staying in the active DL BWP #1 that is not configured with any search space for receiving the specific system information.

Figure 11:
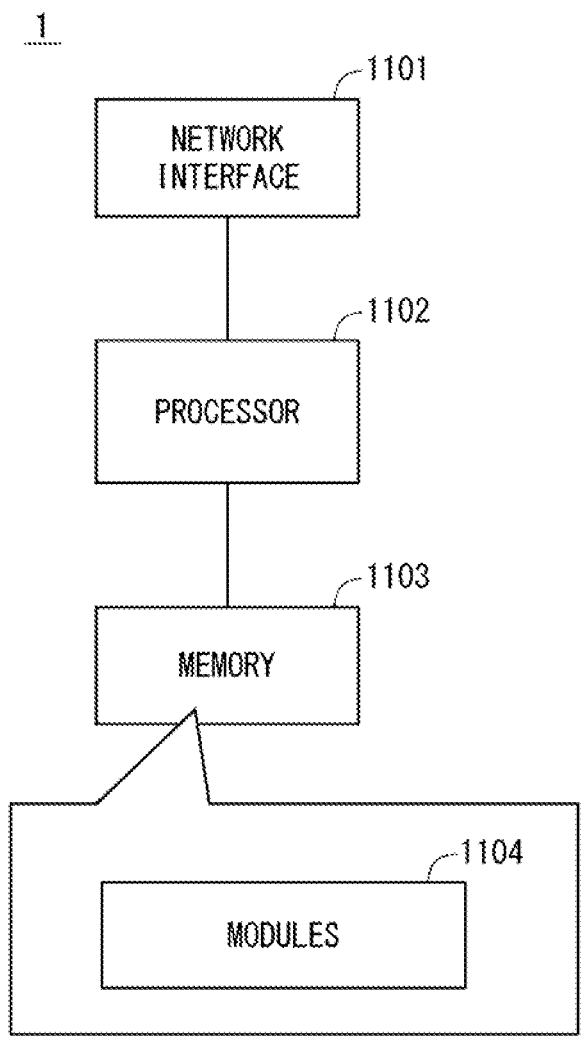
FIG. 11 is a block diagram showing a configuration example of a central node (e.g., gNB-CU) according to some embodiments.

The following provides configuration examples of the gNB-CU 1, the gNB-DU 2, and the UE 3 according to the above embodiments. FIG. 11 is a block diagram showing a configuration example of the gNB-CU 1 according to the above embodiments. Note that configuration examples of the gNB-CU-CP 11 and the gNB-CU-UP 12 may be similar to those shown in FIG. 11. Referring to FIG. 11, the gNB-CU 1 includes a network interface 1101, a processor 1102, and a memory 1103. The network interface 1101 is used to communicate with a network node (e.g., the gNB-DU 2, and control-plane (CP) nodes and user-plane (UP) nodes in the 5GC). The network interface 1101 may include a plurality of interfaces. The network interface 1101 may include an optical-fiber interface for CU-DU communication and a network interface conforming to IEEE 802.3 series.

The processor 1102 performs digital baseband signal processing (i.e., data-plane processing) and control-plane processing for radio communication. The processor 1102 may include a plurality of processors. The processor 1102 may include a modem processor (e.g., a Digital Signal Processor (DSP)) that performs the digital baseband signal processing and a protocol stack processor (e.g., a Central Processing Unit (CPU) or a Micro Processing Unit (MPU)) that performs the control-plane processing.

The memory 1103 is composed of a combination of a volatile memory and a nonvolatile memory. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1103 may include a storage located separately from the processor 1102. In this case, the processor 1102 may access the memory 1103 through the network interface 1101 or an I/O interface (not shown).

The memory 1103 may store one or more software modules (computer programs) 1104 including instructions and data to perform processing by the gNB-CU 1 described in the above embodiments. In some implementations, the processor 1102 may load the one or more software modules 1104 from the memory 1103 and execute the loaded software modules, thereby performing the processing of the gNB-CU 1 described in the above embodiments.

Figure 12:
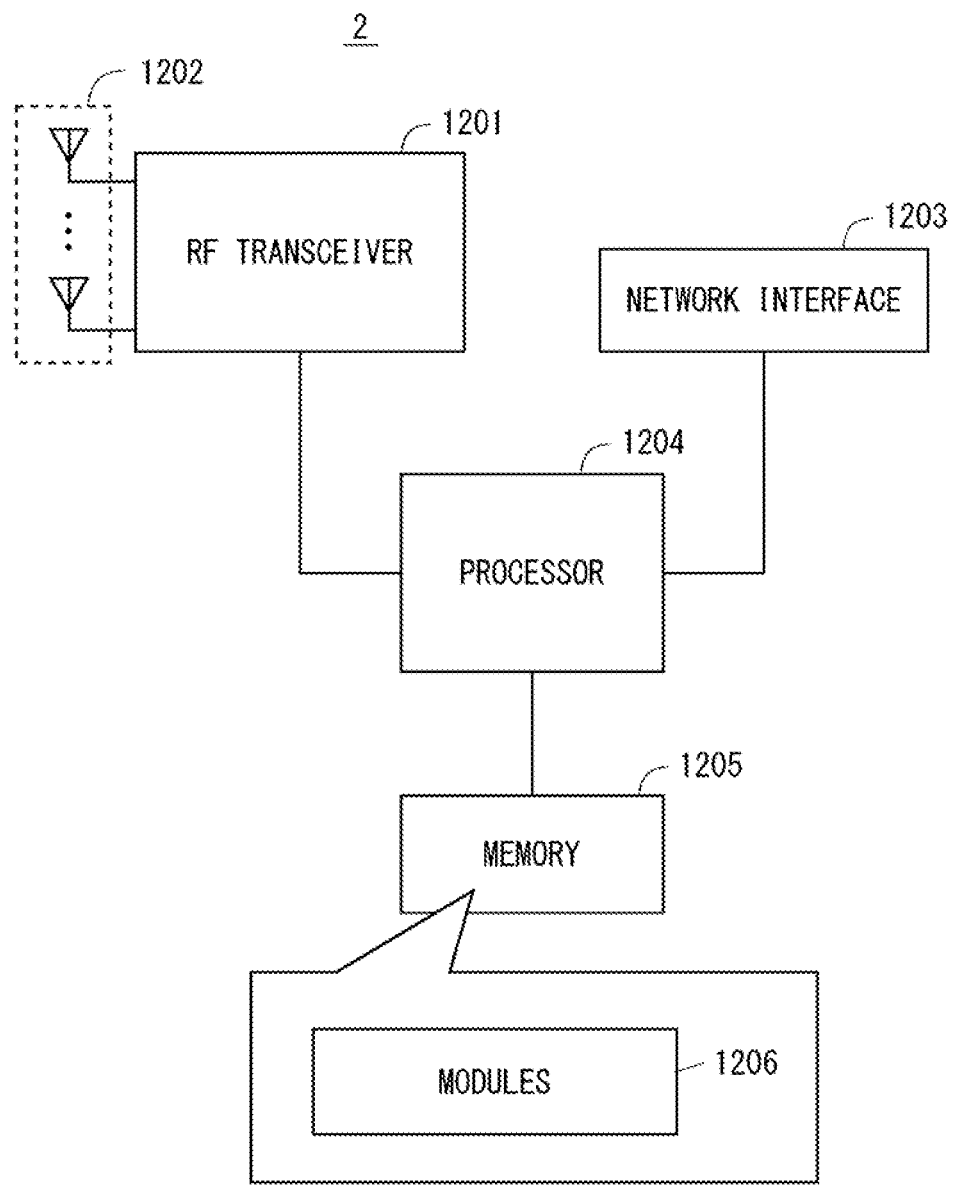
FIG. 12 is a block diagram showing a configuration example of a distributed node (e.g., gNB-DU) according to some embodiments.

FIG. 12 is a block diagram showing a configuration example of the gNB-DU 2 according to the above embodiments. Referring to FIG. 12, the gNB-DU 2 includes a Radio Frequency transceiver 1201, a network interface 1203, a processor 1204, and a memory 1205. The RF transceiver 1201 performs analog RF signal processing to communicate with NG UEs. The RF transceiver 1201 may include a plurality of transceivers. The RF transceiver 1201 is connected to an antenna array 1202 and the processor 1204. The RF transceiver 1201 receives modulated symbol data from the processor 1204, generates a transmission RF signal, and supplies the generated transmission RF signal to the antenna array 1202. Further, the RF transceiver 1201 generates a baseband reception signal based on a reception RF signal received by the antenna array 1202 and supplies this signal to the processor 1204. The RF transceiver 1201 may include an analog beam former circuit for beam forming. The analog beam former circuit includes, for example, a plurality of phase shifters and a plurality of power amplifiers.

The network interface 1203 is used to communicate with network nodes (e.g., the gNB-CU 1, the gNB-CU-CP 11, and the gNB-CU-UP 12). The network interface 1203 may include a plurality of interfaces. The network interface 1203 may include either or both of an optical-fiber interface for CU-DU communication and a network interface conforming to IEEE 802.3 series.

The processor 1204 performs digital baseband signal processing (i.e., data-plane processing) and control-plane processing for radio communication. The processor 1204 may include a plurality of processors. The processor 1204 may include a modem processor (e.g., a DSP)) that performs the digital baseband signal processing and a protocol stack processor (e.g., a CPU or an MPU) that performs the control-plane processing. The processor 1204 may include a digital beam former module for beam forming. The digital beam former module may include a Multiple Input Multiple Output (MIMO) encoder and a MIMO pre-coder.

The memory 1205 is composed of a combination of a volatile memory and a nonvolatile memory. The volatile memory is, for example, an SRAM, a DRAM, or a combination thereof. The non-volatile memory is, for example, an MROM, an EEPROM, a flash memory, a hard disc drive, or any combination thereof. The memory 1205 may include a storage located separately from the processor 1204. In this case, the processor 1204 may access the memory 1205 through the network interface 1203 or an I/O interface (not shown).

The memory 1205 may store one or more software modules (computer programs) 1206 including instructions and data to perform processing by the gNB-DU 2 described in the above embodiments. In some implementations, the processor 1204 may load the one or more software modules 1206 from the memory 1205 and execute the loaded software modules, thereby performing the processing of the gNB-DU 2 described in the above embodiments.

Figure 13:
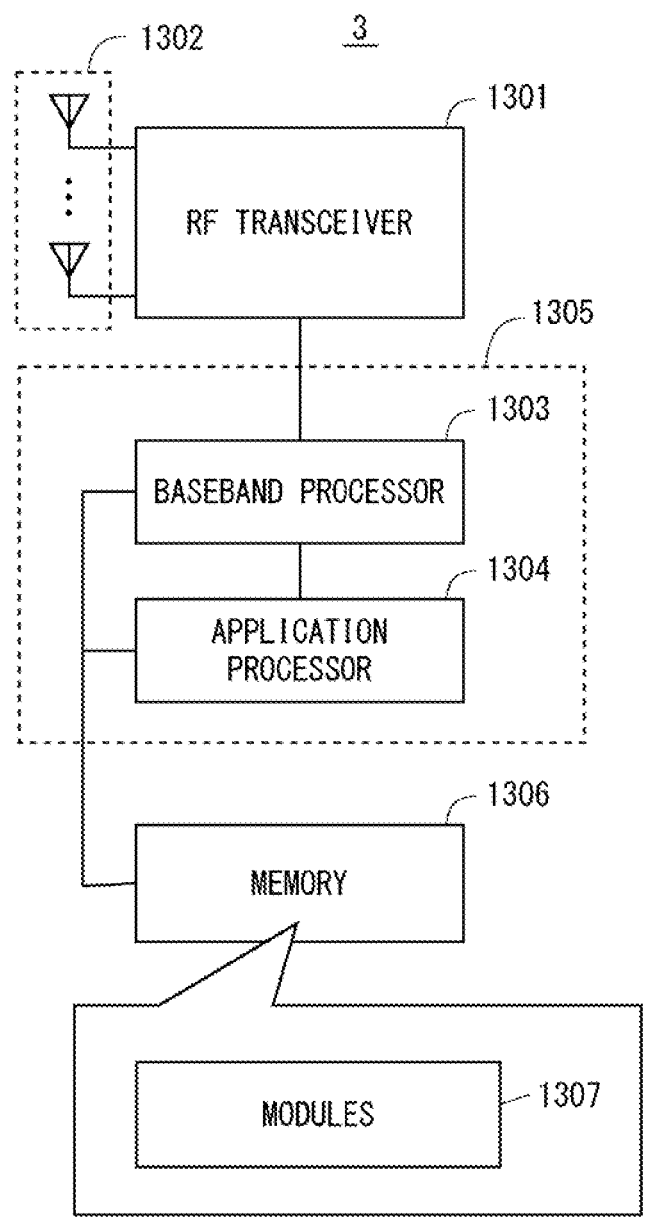
FIG. 13 is a block diagram showing a configuration example of a radio terminal according to some embodiments.

FIG. 13 is a block diagram showing a configuration example of the UE 3 according to the above embodiments. A Radio Frequency (RF) transceiver 1301 performs analog RF signal processing to communicate with a RAN node (e.g., the gNB-DU 2). The RF transceiver 1301 may include a plurality of transceivers. The analog RF signal processing performed by the RF transceiver 1301 includes frequency up-conversion, frequency down-conversion, and amplification. The RF transceiver 1301 is coupled to an antenna array 1302 and a baseband processor 1303. The RF transceiver 1301 receives modulated symbol data (or OFDM symbol data) from the baseband processor 1303, generates a transmission RF signal, and supplies the transmission RF signal to the antenna array 1302. Further, the RF transceiver 1301 generates a baseband reception signal based on a reception RF signal received by the antenna array 1302, and supplies the baseband reception signal to the baseband processor 1303. The RF transceiver 1301 may include an analog beamformer circuit for beam forming. The analog beamformer circuit includes, for example, a plurality of phase shifters and a plurality of power amplifiers.

The baseband processor 1303 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 1303 may include, for example, signal processing of a Service Data Adaptation Protocol (SDAP) layer, a Packet Data Convergence Protocol (PDCP) layer, a Radio Link Control (RLC) layer, a MAC layer, and a PHY layer. Further, the control-plane processing performed by the baseband processor 1303 may include processing of a Non-Access Stratum (NAS) protocol, an RRC protocol, and MAC CEs.

The baseband processor 1303 may perform MIMO encoding and pre-coding for beam forming.

The baseband processor 1303 may include a modem processor (e.g., DSP) that performs the digital baseband signal processing and a protocol stack processor (e.g., a CPU or an MPU) that performs the control-plane processing. In this case, the protocol stack processor, which performs the control-plane processing, may be integrated with an application processor 1304 described in the following.

The application processor 1304 is also referred to as a CPU, an MPU, a microprocessor, or a processor core. The application processor 1304 may include a plurality of processors (processor cores). The application processor 1304 loads a system software program (Operating System (OS)) and various application programs (e.g., a call application, a WEB browser, a mailer, a camera operation application, and a music player application) from a memory 1306 or from another memory (not shown) and executes these programs, thereby providing various functions of the UE 3.

In some implementations, as represented by a dashed line (1305) in FIG. 13, the baseband processor 1303 and the application processor 1304 may be integrated on a single chip. In other words, the baseband processor 1303 and the application processor 1304 may be implemented in a single System on Chip (SoC) device 1305. An SoC device may be referred to as a system Large Scale Integration (LSI) or a chipset.

The memory 1306 is a volatile memory, a non-volatile memory, or a combination thereof. The memory 1306 may include a plurality of memory devices that are physically independent from each other. The volatile memory is, for example, an SRAM, a DRAM, or any combination thereof. The non-volatile memory is, for example, an MROM, an EEPROM, a flash memory, a hard disc drive, or any combination thereof. The memory 1306 may include, for example, an external memory device that can be accessed from the baseband processor 1303, the application processor 1304, and the SoC 1305.

The memory 1306 may include an internal memory device that is integrated in the baseband processor 1303, the application processor 1304, or the SoC 1305. Further, the memory 1306 may include a memory in a Universal Integrated Circuit Card (UICC).

The memory 1306 may store one or more software modules (computer programs) 1307 including instructions and data to perform the processing by the UE 3 described in the above embodiments. In some implementations, the baseband processor 1303 or the application processor 1304 may load these software modules 1307 from the memory 1306 and execute the loaded software modules, thereby performing the processing of the UE 3 described in the above embodiments with reference to the drawings.

Note that, the control plane processes and operations described in the above embodiments can be achieved by the elements other than the RF transceiver 1301 and the antenna array 1302, i.e., achieved by the memory 1306 storing the software modules 1307 and at least one of the baseband processor 1303 and the application processor 1304.

As described above with reference to FIGS. 11 to 13, each of the processors included in the gNB-CU 1, the gNB-DU 2, and the UE 3 according to the above embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

The signaling between the gNB-CU 1 and the gNB-DU 2 described in the above embodiments may be performed between the gNB-CU-CP 11 and the gNB-DU 2.

Further, the above embodiments are merely examples of applications of the technical ideas obtained by the inventor. These technical ideas are not limited to the above embodiments and various modifications may be made thereto.

For example, the whole or part of the embodiments disclosed above can be described as, but not limited to, the following supplementary notes.

(Supplementary Note A1)

A distributed unit of a base station, the distributed unit comprising:
  at least one memory; and
  at least one processor coupled to the at least one memory and configured to:
    in response to receiving from a central unit of the base station a signaling message requesting a broadcast of specific system information, change an active downlink Bandwidth Part (BWP) of a plurality of radio terminals from a first downlink BWP that is not configured with a search space for receiving the specific system information to a second downlink BWP that is configured with a search space for receiving the specific system information; and
    broadcast the specific system information on the second downlink BWP in response to receiving the signaling message.

(Supplementary Note A2)

The distributed unit according to Supplementary note A1, wherein the at least one processor is further configured to transmit, to the plurality of radio terminals, downlink control information indicating a change of the active downlink BWP from the first downlink BWP to the second downlink BWP, and
  wherein the downlink control information further includes an indication that triggers reception of the specific system information in the second downlink BWP.

(Supplementary Note A3)

The distributed unit according to Supplementary note A1 or A2, wherein the first downlink BWP is an initial downlink BWP, and the second downlink BWP is an initial downlink BWP.

(Supplementary Note A4)

The distributed unit according to any one of Supplementary notes A1 to A3, wherein the specific system information is a Warning message of a Public Warning System (PWS).

Supplementary Note A5)

The distributed unit according to Supplementary note A4, wherein the signaling message is a WRITE-REPLACE WARNING REQUEST message sent from the central unit to the distributed unit on an F1 interface.

(Supplementary Note A6)

A method performed by a distributed unit of a base station, the method comprising:
  in response to receiving from a central unit of the base station a signaling message requesting a broadcast of specific system information, changing an active downlink Bandwidth Part (BWP) of a plurality of radio terminals from a first downlink BWP that is not configured with a search space for receiving the specific system information to a second downlink BWP that is configured with a search space for receiving the specific system information; and
  broadcasting the specific system information on the second downlink BWP in response to receiving the signaling message.

(Supplementary Note A7)

The method according to Supplementary note A6, wherein the changing comprises transmitting, to the plurality of radio terminals, downlink control information indicating a change of the active downlink BWP from the first downlink BWP to the second downlink BWP, and
  wherein the downlink control information further includes an indication that triggers reception of the specific system information in the second downlink BWP.

(Supplementary Note A8)
The method according to Supplementary note A6 or A7, wherein the first downlink BWP is an initial downlink BWP, and the second downlink BWP is an initial downlink BWP.

(Supplementary Note A9)
The method according to any one of Supplementary notes A6 to A8, wherein the specific system information is a Warning message of a Public Warning System (PWS).

(Supplementary Note A10)
The method according to Supplementary note A9, wherein the signaling message is a WRITE-REPLACE WARNING REQUEST message sent from the central unit to the distributed unit on an F1 interface.

(Supplementary Note A11)
A program for causing a computer to perform a method for a distributed unit of a base station, wherein the method comprises:
  in response to receiving from a central unit of the base station a signaling message requesting a broadcast of specific system information, changing an active downlink Bandwidth Part (BWP) of a plurality of radio terminals from a first downlink BWP that is not configured with a search space for receiving the specific system information to a second downlink BWP that is configured with a search space for receiving the specific system information; and
  broadcasting the specific system information on the second downlink BWP in response to receiving the signaling message.

(Supplementary Note B1)
A distributed unit of a base station, the distributed unit comprising:
  at least one memory; and
  at least one processor coupled to the at least one memory and configured to:
    in response to receiving from a central unit of the base station a first signaling message that requests a broadcast of specific system information and is not associated with a particular radio terminal, generate a plurality of dedicated signaling messages, wherein each of the plurality of dedicated signaling messages contains the specific system information and is associated with a respective one of a plurality of radio terminals staying in a first downlink BWP that is not configured with a search space for receiving the specific system information; and
    transmit the plurality of dedicated signaling messages to the plurality of radio terminals on the first downlink BWP.

(Supplementary Note B2)
The distributed unit according to Supplementary note B1, wherein the at least one processor is further configured to broadcast the specific system information on a second downlink BWP that is configured with a search space for receiving the specific system information.

(Supplementary Note B3)
The distributed unit according to Supplementary note B1 or B2, wherein
  each of the plurality of dedicated signaling messages is a Radio Resource Control (RRC) message, and
  the at least one processor is further configured to transmit the plurality of dedicated signaling messages without using a security key for ciphering of RRC signaling.

(Supplementary Note B4)
The distributed unit according to Supplementary note B3, wherein the at least one processor is further configured to transmit to the plurality of radio terminals, prior to transmitting the plurality of dedicated signaling messages, downlink control information indicating scheduling of downlink radio resources for an RRC message that is not encrypted with the security keys.

(Supplementary Note B5)
The distributed unit according to Supplementary note B1 or B2, wherein
  each of the plurality of dedicated signaling messages is a Radio Resource Control (RRC) message, and
  the at least one processor is further configured to receive from the central unit a plurality of security keys for ciphering of the plurality of dedicated signaling messages.

(Supplementary Note B6)
The distributed unit according to any one of Supplementary notes B1 to B5, wherein the specific system information is a Warning message of a Public Warning System (PWS).

(Supplementary Note B7)
The distributed unit according to Supplementary note B6, wherein the first signaling message is a WRITE-REPLACE WARNING REQUEST message sent from the central unit to the distributed unit on an F1 interface.

(Supplementary Note B8)
A method performed by a distributed unit of a base station, the method comprising:
  in response to receiving from a central unit of the base station a first signaling message that requests a broadcast of specific system information and is not associated with a particular radio terminal, generating a plurality of dedicated signaling messages, wherein each of the plurality of dedicated signaling messages contains the specific system information and is associated with a respective one of a plurality of radio terminals staying in a first downlink BWP that is not configured with a search space for receiving the specific system information; and
  transmitting the plurality of dedicated signaling messages to the plurality of radio terminals on the first downlink BWP.

(Supplementary Note B9)
The method according to Supplementary note B8, further comprising broadcasting the specific system information on a second downlink BWP that is configured with a search space for receiving the specific system information.

(Supplementary Note B10)
The method according to Supplementary note B8 or B9, wherein each of the plurality of dedicated signaling messages is a Radio Resource Control (RRC) message, and
  the transmitting comprises transmitting the plurality of dedicated signaling messages without using a security key for ciphering of RRC signaling.

(Supplementary Note B11)
The method according to Supplementary note B10, further comprising transmitting to the plurality of radio terminals, prior to transmitting the plurality of dedicated signaling messages, downlink control information indicating scheduling of downlink radio resources for an RRC message that is not encrypted with the security key.

(Supplementary Note B12)

The method according to Supplementary note B8 or B9, wherein each of the plurality of dedicated signaling messages is a Radio Resource Control (RRC) message, and the method further comprises receiving from the central unit a plurality of security keys for ciphering of the plurality of dedicated signaling messages.

(Supplementary Note B13)

The method according to any one of Supplementary notes B8 to B12, wherein the specific system information is a Warning message of a Public Warning System (PWS).

(Supplementary Note B14)

The method according to Supplementary note B13, wherein the first signaling message is a WRITE-REPLACE WARNING REQUEST message sent from the central unit to the distributed unit on an F1 interface.

(Supplementary Note B15)

A program for causing a computer to perform a method for a distributed unit of a base station, wherein the method comprises:
- in response to receiving from a central unit of the base station a first signaling message that requests a broadcast of specific system information and is not associated with a particular radio terminal, generating a plurality of dedicated signaling messages, wherein each of the plurality of dedicated signaling messages contains the specific system information and is associated with a plurality of radio terminals staying in a first downlink BWP that is not configured with a search space for receiving the specific system information; and
- transmitting the plurality of dedicated signaling messages to the plurality of radio terminals on the first downlink BWP.

(Supplementary note B16)

A radio terminal comprising:
- a memory; and
- at least one processor coupled to the memory and configured to:
  - when the radio terminal is staying in a first downlink BWP that is not configured with a search space for receiving specific system information, receive, on the first downlink BWP, downlink control information indicating scheduling of downlink radio resources for a Radio Resource Control (RRC) message that is not encrypted with a security key; and
  - in response to receiving the downlink control information, receive, on the first downlink BWP without using the security key, a dedicated RRC message that is associated with the radio terminal and contains the specific system information.

(Supplementary Note B17)

The radio terminal according to Supplementary note B16, wherein the at least one processor is further configured to, when the radio terminal is staying in a second downlink BWP that is configured with a search space for receiving the specific system information, receive the specific system information via a broadcast on the second downlink BWP.

(Supplementary Note B18)

The radio terminal according to Supplementary note B16 or B17, wherein the specific system information is a Warning message of a Public Warning System (PWS).

(Supplementary Note B19)

A method performed by a radio terminal, the method comprising:
- when the radio terminal is staying in a first downlink BWP that is not configured with a search space for receiving specific system information, receiving, on the first downlink BWP, downlink control information indicating scheduling of downlink radio resources for a Radio Resource Control (RRC) message that is not encrypted with a security key; and
- in response to receiving the downlink control information, receiving, on the first downlink BWP without using the security key, a dedicated RRC message that is associated with the radio terminal and contains the specific system information.

(Supplementary Note B20)

The method according to Supplementary note B19, further comprising, when the radio terminal is staying in a second downlink BWP that is configured with a search space for receiving the specific system information, receiving the specific system information via a broadcast on the second downlink BWP.

(Supplementary Note B21)

The method according to Supplementary note B19 or B20, wherein the specific system information is a Warning message of a Public Warning System (PWS).

(Supplementary Note B22)

A program for causing a computer to perform a method for a radio terminal, wherein the method comprises:
- when the radio terminal is staying in a first downlink BWP that is not configured with a search space for receiving specific system information, receiving, on the first downlink BWP, downlink control information indicating scheduling of downlink radio resources for a Radio Resource Control (RRC) message that is not encrypted with a security key; and
- in response to receiving the downlink control information, receiving, on the first downlink BWP without using the security key, a dedicated RRC message that is associated with the radio terminal and contains the specific system information.

This application is based upon and claims the benefit of priority from Japanese Patent Application No. 2018-168059, filed on Sep. 7, 2018, the disclosure of which is incorporated herein in its entirety by reference.

REFERENCE SIGNS LIST 1 gNB-CU
2 gNB-DU
3 UE
11 gNB-CU-CP
12 gNB-CU-UP
1102 PROCESSOR
1103 MEMORY
1104 MODULES
1204 PROCESSOR
1205 MEMORY
1206 MODULES
1303 BASEBAND PROCESSOR
1304 APPLICATION PROCESSOR
1306 MEMORY
1307 MODULES

What is claimed is:

1. A distributed unit of a base station, the distributed unit comprising:
- at least one memory; and
- at least one processor coupled to the at least one memory and configured to:
  - in response to receiving from a central unit of the base station a signaling message requesting a broadcast of specific system information, change an active downlink Bandwidth Part (BWP) of a plurality of radio terminals from a first downlink BWP that is not configured with a search space for receiving the specific system information to a second downlink BWP that is configured with a search space for receiving the specific system information; and broadcast the specific system information on the second downlink BWP in response to receiving the signaling message.

2. The distributed unit according to claim 1, wherein the at least one processor is further configured to transmit, to the plurality of radio terminals, downlink control information indicating a change of the active downlink BWP from the first downlink BWP to the second downlink BWP, and wherein the downlink control information further includes an indication that triggers reception of the specific system information in the second downlink BWP.

3. The distributed unit according to claim 1, wherein the first downlink BWP is a non-initial downlink BWP, and the second downlink BWP is an initial downlink BWP.

4. The Distributed unit according to claim 1, wherein the specific system information is a Warning message of a Public Warning System (PWS).

5. The distributed unit according to claim 4, wherein the signaling message is a WRITE-REPLACE WARNING REQUEST message sent from the central unit to the distributed unit on an F1 interface.

6. A method performed by a distributed unit of a base station, the method comprising:

in response to receiving from a central unit of the base station a signaling message requesting a broadcast of specific system information, changing an active downlink Bandwidth Part (BWP) of a plurality of radio terminals from a first downlink BWP that is not configured with a search space for receiving the specific system information to a second downlink BWP that is configured with a search space for receiving the specific system information; and broadcasting the specific system information on the second downlink BWP in response to receiving the signaling message.

7. The method according to claim 6, wherein the changing comprises transmitting, to the plurality of radio terminals, downlink control information indicating a change of the active downlink BWP from the first downlink BWP to the second downlink BWP, and wherein the downlink control information further includes an indication that triggers reception of the specific system information in the second downlink BWP.

8. The method according to claim 6, wherein the first downlink BWP is a non-initial downlink BWP, and the second downlink BWP is an initial downlink BWP.

9. The method according to claim 6, wherein the specific system information is a Warning message of a Public Warning System (PWS).

10. The method according to claim 9, wherein the signaling message is a WRITE-REPLACE WARNING REQUEST message sent from the central unit to the distributed unit on an F1 interface.

11. A distributed unit of a base station, the distributed unit comprising:

at least one memory; and at least one processor coupled to the at least one memory and configured to:

in response to receiving from a central unit of the base station a first signaling message that requests a broadcast of specific system information and is not associated with a particular radio terminal, generate a plurality of dedicated signaling messages, wherein each of the plurality of dedicated signaling messages contains the specific system information and is associated with a respective one of a plurality of radio terminals staying in a first downlink BWP that is not configured with a search space for receiving the specific system information; and transmit the plurality of dedicated signaling messages to the plurality of radio terminals on the first downlink BWP.

12. The distributed unit according to claim 11, wherein the at least one processor is further configured to broadcast the specific system information on a second downlink BWP that is configured with a search space for receiving the specific system information.

13. The distributed unit according to claim 11, wherein each of the plurality of dedicated signaling messages is a Radio Resource Control (RRC) message, and the at least one processor is further configured to transmit the plurality of dedicated signaling messages without using a security key for ciphering of RRC signaling.

14. The distributed unit according to claim 13, wherein the at least one processor is further configured to transmit to the plurality of radio terminals, prior to transmitting the plurality of dedicated signaling messages, downlink control information indicating scheduling of downlink radio resources for an RRC message that is not encrypted with the security key.

15. The distributed unit according to claim 11, wherein each of the plurality of dedicated signaling messages is a Radio Resource Control (RRC) message, and the at least one processor is further configured to receive from the central unit a plurality of security keys for ciphering of the plurality of dedicated signaling messages.

16. The distributed unit according to claim 11, wherein the specific system information is a Warning message of a Public Warning System (PWS).

17. The distributed unit according to claim 16, wherein the first signaling message is a WRITE-REPLACE WARNING REQUEST message sent from the central unit to the distributed unit on an F1 interface.

* * * * *